(12) United States Patent
Hudry et al.

(10) Patent No.: US 9,231,391 B2
(45) Date of Patent: Jan. 5, 2016

(54) ELECTRIC VEHICLE CHARGING-SOCKET FLAP DEVICE COMPATIBLE WITH PEDESTRIAN IMPACTS

(75) Inventors: Efflam Hudry, Boulogne (FR); Patrick Bouas, Draveil (FR); Florent Metais, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 146 days.

(21) Appl. No.: 14/006,108

(22) PCT Filed: Mar. 2, 2012

(86) PCT No.: PCT/FR2012/050446
§ 371 (c)(1),
(2), (4) Date: Sep. 19, 2013

(87) PCT Pub. No.: WO2012/131204
PCT Pub. Date: Oct. 4, 2012

(65) Prior Publication Data
US 2014/0008096 A1    Jan. 9, 2014

(30) Foreign Application Priority Data
Mar. 31, 2011 (FR) .................... 11 52696

(51) Int. Cl.
*H02G 3/14* (2006.01)
*B60K 15/05* (2006.01)
*B60L 11/18* (2006.01)
*B60R 21/34* (2011.01)
*H01R 13/447* (2006.01)

(52) U.S. Cl.
CPC *H02G 3/14* (2013.01); *B60K 15/05* (2013.01); *B60L 11/1818* (2013.01); *B60R 21/34* (2013.01); *H01R 13/447* (2013.01); *B60R 2021/343* (2013.01); *H01R 2201/26* (2013.01); *Y02T 10/7005* (2013.01); *Y02T 90/14* (2013.01)

(58) Field of Classification Search
USPC ............... 174/66, 67; 220/241, 242; 139/136; 340/584; 361/42; 320/109
See application file for complete search history.

(56) References Cited

U.S. PATENT DOCUMENTS

| 4,658,088 | A | * | 4/1987 | Gartland et al. | ................ 174/66 |
| 5,391,837 | A | * | 2/1995 | Carey | ................ 174/50 |
| 6,765,149 | B1 | * | 7/2004 | Ku | ................ 174/66 |

FOREIGN PATENT DOCUMENTS

FR    2 931 400    11/2009

OTHER PUBLICATIONS

International Search Report Issued May 2, 2012 in PCT/FR12/50446 Filed Mar. 2, 2012.
French Search Report Issued Oct. 7, 2011 in FR 1152696 Filed Mar. 31, 2011.

* cited by examiner

*Primary Examiner* — Dhirubhai R Patel
(74) *Attorney, Agent, or Firm* — Oblon, McClelland, Maier & Neustadt, L.L.P.

(57) ABSTRACT

A charging-socket flap device for electric vehicles, including: a structure including an aperture and a jacket adjacent to the aperture, the jacket including an orifice; a movable gate forming a flap configured to close the aperture of the structure; an element hinging the gate housed in the jacket; a cover configured to close the orifice of the jacket. The cover is mounted on the orifice of the jacket to be a distance away from the orifice on at least one edge of the orifice in the closed position on the jacket, the cover being kept a distance away from the edge by a support making it possible for the cover to move with a damped movement toward the edge when a region of the vehicle body panel covering the flap device is impacted, or impacted by a pedestrian.

10 Claims, 3 Drawing Sheets

ELECTRIC VEHICLE CHARGING-SOCKET FLAP DEVICE COMPATIBLE WITH PEDESTRIAN IMPACTS

BACKGROUND OF INVENTION

1. Field of Invention

The invention relates to an electric vehicle charging-socket flap device, in particular comprising a gooseneck housing, compatible with pedestrian impacts.

2. Description of the Related Art

It is known that electric charging-socket flaps on electric vehicles are installed substantially in the central part of the front facade of said vehicles. The opening of the flap is formed in a housing accommodating an articulation element for a gate for closing the opening of the flap, which during operation receives an electric plug for charging the battery of the electric vehicle. The articulation element is generally of the gooseneck type, protruding into the housing. The housing is closed by a cover protecting it from dust and water. The cover has a concave external shape permitting the displacement of the articulation element. The cover is more particularly exposed to impacts, forming a hard point below the engine hood, which may be dangerous for pedestrians in the event of impacts against the front facade of the vehicle body.

BRIEF SUMMARY OF THE INVENTION

There is, therefore, a need to deal with the dangerous nature of said electric charging-socket flaps in electric vehicles and more particularly the cover of the housing accommodating the articulation element.

An electric vehicle charging-socket flap device is proposed, comprising:
- a frame comprising an aperture and a housing adjacent to the aperture, the housing having an orifice,
- a mobile gate forming a flap capable of closing the aperture of the frame,
- an articulation element for the gate accommodated in the housing,
- a cover capable of closing the orifice of the housing, characterized in that the cover is mounted on the orifice of the housing so as to be separated from said orifice on at least one edge of the orifice in the position in which it is closed on the housing, the cover being kept separated from the edge by a retaining means capable of permitting the cover to be displaced in a damped manner toward the edge in the event of an impact, in particular the impact of a pedestrian on an area of the wall of the body of the vehicle covering the flap device.

Such a retaining means makes it possible to maintain the cover at a predetermined distance from one or more edges of the orifice of the housing in the closed position of the cover.

When the flap device according to the invention is mounted in a vehicle, generally below a body wall, it is oriented such that the orifice of the housing is turned toward said body wall of the vehicle, for example the engine hood of the vehicle.

As a result of the arrangement of the flap device according to the invention, the cover is capable of absorbing at least part of an impact at its location on the vehicle by being moved in a damped manner toward the edge of the orifice provided with the retaining means, which makes it possible both to limit the force of impact on the hard point formed by the electric charging-socket flap device, in particular for a pedestrian subjected to an impact at this point of the body of the vehicle, and also to limit the risk of the cover breaking.

This is all the more important when the flap device is installed substantially in the central part of the front facade of the body of the vehicle below the engine hood of the vehicle, which is the area which is most vulnerable to pedestrian impact.

Depending on the manner of fixing to the housing, the cover could be removable, making it possible to open up entirely the orifice of the housing to access the articulation element, or mobile between the closed position and an open position permitting access to the articulation element.

Advantageously, the articulation element is of the gooseneck type, for example formed in one piece with the gate. Such an element has the form of a gooseneck, one end thereof being fixed to the gate, and the articulation thereof to the housing is offset relative to its end fixed to the gate, thus permitting the frame to be opened up wide when the gate is opened.

Advantageously, the retaining means is designed so as to exert a return of the cover from a position in abutment against the orifice to a position separated from the orifice where the free displacement of the articulation element may be carried out.

The force exerted by the retaining means for retaining or restoring the cover such that it is separated from the orifice of the housing could be adjusted to a value which is sufficient to dampen the impact of a pedestrian, in particular of average height, on the flap device, for example between 100 and 200 newtons (including the limits thereof)

The distance separating the cover from the corresponding edge of the orifice of the housing is determined so as to be sufficient to absorb the displacement clearance in the housing of the articulation element of the flap gate, in particular a gooseneck articulation element in the housing in order to avoid the articulation element rubbing on the cover in the closed position of the cover. This distance may be, for example, between 5 and 15 mm.

According to an embodiment, the retaining means comprises at least one leaf spring fixed to the cover or to an edge of the orifice of the housing and in engagement with the corresponding edge of the orifice of the housing or the corresponding part of the cover, respectively.

Such a spring constitutes a simple and easy means of implementing the retaining means.

Naturally, according to another embodiment, the retaining means may alternatively comprise an arrangement of a shock-absorbing actuator or brake connected to the cover and to the orifice of the housing or a seal consisting of foam or elastomeric material interposed between the cover and the orifice of the housing, capable in the event of an impact of damping the movement of the cover toward the orifice of the housing.

Various embodiments of the retaining means may be used alone or in combination to retain the cover separated from the edge of the orifice of the housing.

Advantageously, the cover may have at least one projection opposite one edge of the orifice of the housing, when the housing is in the closed position, the retaining means being arranged between said projection and said edge in order to keep them separated from one another in the closed position of the cover.

The orifice of the housing advantageously has a polygonal shape, for example the shape of a rectangle, although other shapes are conceivable.

Advantageously, on at least one part of its periphery the cover comprises a skirt surrounding the edge of the orifice of the housing when the cover is in the closed position, thus preventing the ingress of dust and water into the housing.

The cover may be guided in its displacement in a damped manner toward the edge of the orifice of the housing, in the event of an impact, via at least one opening, preferably two opposing lateral openings of the skirt of the cover, each cooperating with a corresponding guide element of the housing slidably mounted in the opening.

Said guide element may be a lug or a clip.

Advantageously, the guide element is a clip permitting the rapid mounting of the cover in the closed position on the housing by a simple manual push against the cover in position on the orifice of the housing. It is possible, in particular, to envisage that the cover is mounted on the housing solely by clips.

The guide element may constitute an end-of-travel element of the cover at one end of the opening in the separated position of the cover on the orifice of the housing, but it may also constitute an end-of-travel stop element of the cover, at the other end of the opening, for the movement of the cover toward the housing in the event of an impact.

The cover may be positioned or articulated on a first edge or side of the orifice of the housing and kept separated from the orifice on a second edge or side, preferably remote from the first edge or side. Thus, in the event of an impact in its locality, the cover behaves in a manner similar to that of a bellows.

The side where the cover is separated from the edge of the orifice of the housing is preferably that which is closest to the wall of the vehicle liable to receive an impact, in particular the engine hood of the vehicle.

The side where the cover is separated from the edge of the orifice of the housing may be that which is the most remote from the gate forming the flap.

However, the cover may also be kept separated from the orifice of the housing on one or more sides of the cover, preferably in the vicinity of the wall of the vehicle, or even on all sides thereof.

The cover of the housing advantageously has a convex shape adapted to the displacement of the articulation element, in particular a gooseneck articulation element.

A vehicle comprising an electric charging-socket flap device as described above is also proposed.

BRIEF DESCRIPTION OF THE SEVERAL VIEWS OF THE DRAWINGS

The invention is described hereinafter by means of a non-limiting example and with reference to the accompanying drawings, in which:

FIG. 5 is an enlarged view of the side of the cover of the housing separated from the orifice of the housing.

Figure 1:
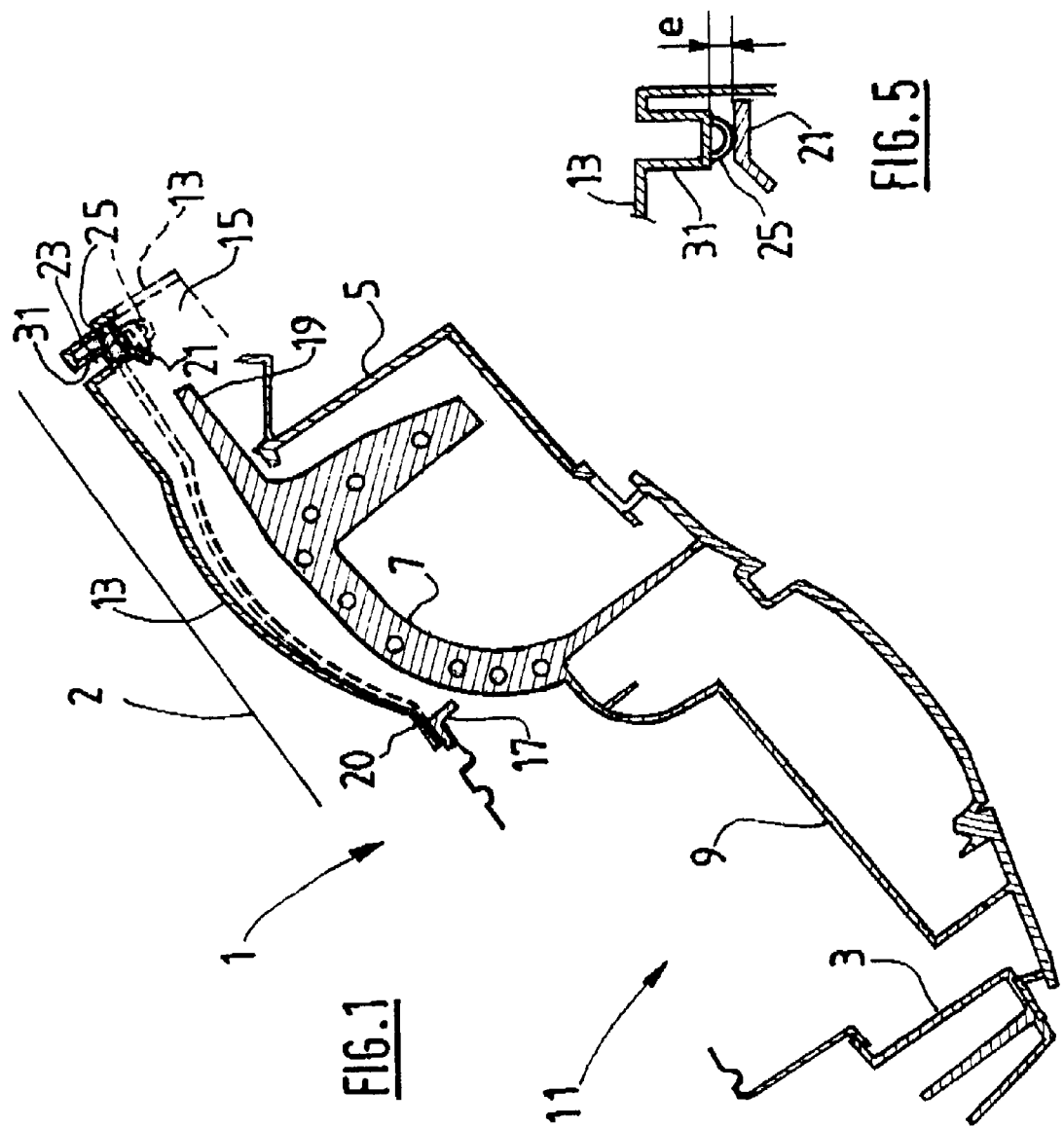
FIG. 1 is a schematic sectional view of an electric vehicle charging-socket flap device according to one embodiment of the invention.

The electric charging-socket flap device 1, as shown in FIG. 1, is designed to be installed in the central part of the front facade of the body of an electric motor vehicle (not shown), in particular below the engine hood 2 of said vehicle, at a short distance therefrom (5 to 50 mm).

Said flap device 1 has a frame 3 comprising an aperture 11 and a housing 5 adjacent to the aperture 11.

The device also comprises a mobile gate 9 forming a flap capable of closing the aperture 11.

DETAILED DESCRIPTION OF THE INVENTION

Said aperture 11 advantageously forms an opening for an electric charging socket closed by the gate 9, via which it is possible to access a connector via an electrical plug (not shown). If the gate 9 is open, it is thus possible to connect the electrical plug (not shown) to the connector via the aperture 11.

The housing 5 accommodates a gooseneck articulation element 7 of the gate 9 for closing the aperture 11.

In the example, said gooseneck articulation element 7 is made in one piece with the gate 9.

Said articulation element of the gooseneck type 7 comprises an axis of articulation 8 (FIG. 2) offset in the housing 5 outside the aperture 11 which ensures a wide opening of the gate 9 of the aperture 11. As a result, it permits easy introduction of the plug into the aperture 11.

The housing 5 is surmounted by a cover 13 having a substantially rectangular base (see also FIGS. 3 and 4) provided with a peripheral skirt 15 which surrounds an upper orifice 17 of the housing and closes said orifice, thus preventing the ingress of any dust or water capable of affecting the articulation element 7. Said orifice is turned toward the body wall of the vehicle, for example the engine hood of the vehicle, below which the flap device according to the invention is mounted, to permit a to the articulation element.

The housing 5 constitutes a rigid protruding part of the flap device 1 in the vicinity of the engine hood 2 of the vehicle and constitutes a hard point in the event of impact, in particular in the region of its cover, in particular an impact of a pedestrian knocked over onto the engine hood of the vehicle. As a result, the cover is often also subjected to damage during such an impact.

The cover 13 has a bulged surface with a clearance below its face turned toward the articulation element 7 permitting the displacement of said articulation element (FIG. 2), in particular of its end part 19 opposite to the gate, which is shown in dashed lines in the open position of the gate.

The cover 13 is mounted on the upper orifice 17 of the housing and closes the orifice 17 in the closed position.

Said cover may be mobile or removable. In the example, it is articulated or simply rests on its end face 20 closest to the gate 9. The end face opposite to the previous end is provided with a projection 31 opposite the edge of the orifice 17 of the housing, advantageously extending parallel to the skirt. In the example shown, said projection 31 is formed by a cavity 31 of U-shaped section and its central arm is formed opposite the edge 21 of the orifice of the housing. The projection 31 could, however, be produced in any other suitable manner. It could, for example, be a wall extending perpendicular to the cover and having a thickness which is sufficient to support or receive a retaining means.

Said projection 31 is kept raised or separated from the corresponding edge 21 of the opening of the housing (upwards as seen in the drawing of FIG. 5).

The clearance e between the end projection 31 of the cover and the corresponding edge 21 of the housing amounts to several millimeters, for example 5 to 15 mm.

This clearance e is maintained due to a retaining means 23 comprising a spring 25 in the example shown.

The spring 25 is a leaf spring fixed to the end projection 31 below said projection.

Figure 2:
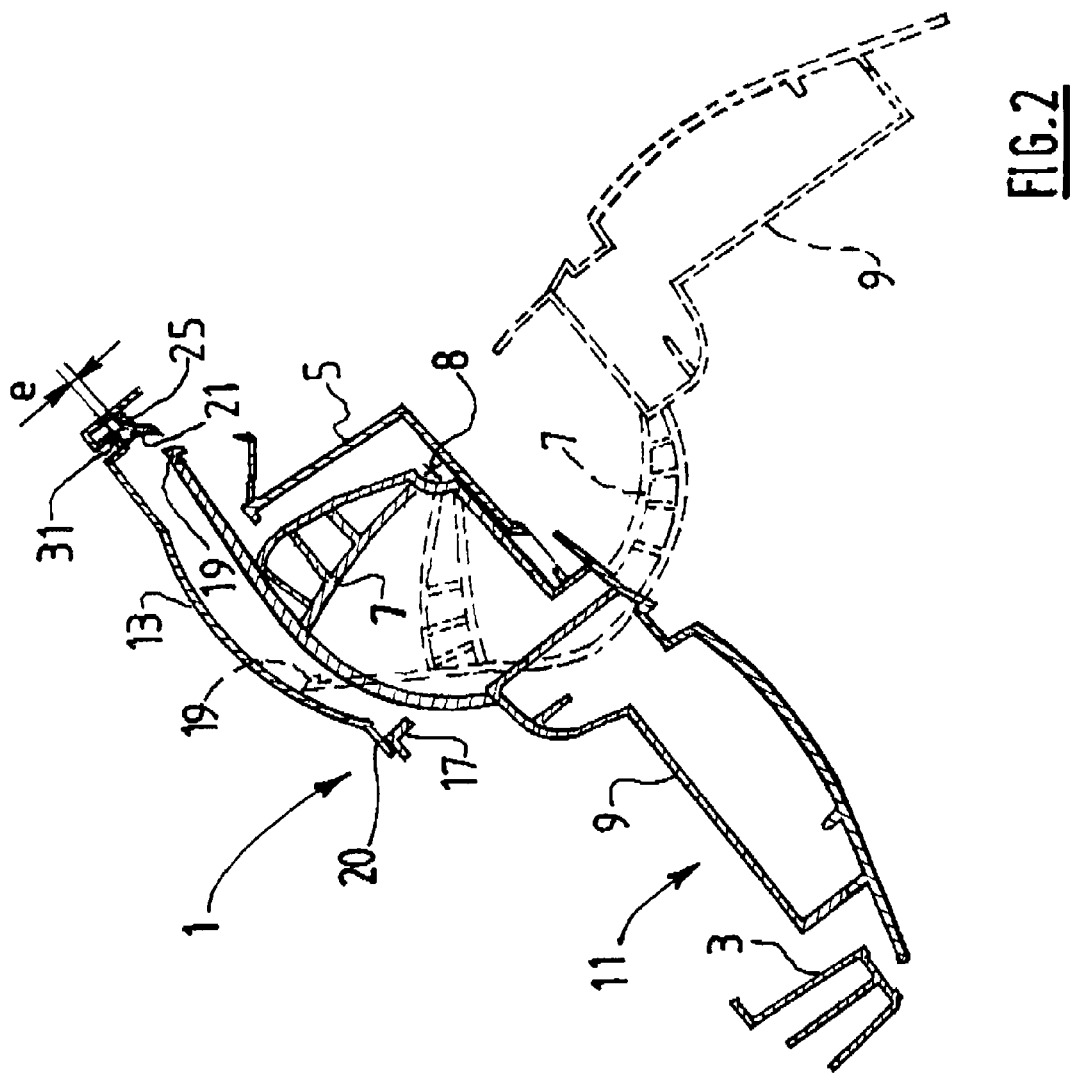
FIG. 2 is a view similar to FIG. 1 showing the displacement of the gate forming the flap.

The spring 25 is interposed between the projection 31 and the edge 21, being capable of bearing in the closed position of the cover against the edge 21 of the housing to maintain the clearance e. The restoring force for maintaining the cover separated from the housing orifice (upward as seen in FIG. 2) may be approximately 150 newtons.

Two lateral openings 29 (FIGS. 3 and 4) are cut out from the skirt 15 of the cover. Said openings which oppose one another relative to a longitudinal median plane of symmetry P of the cover receive clips 27 guiding the movement of the cover toward the orifice of the housing, in the event of any impact there might be on the cover. The movement of the cover downward, in the event of an impact, is carried out in a damped manner, due to the restoring action of the spring.

The clips 27 are slidably mounted in symmetry relative to one another, relative to the plane P, each in one of the respective openings 29, over a length e equal to the clearance e.

Said clips 27 are designed to come into abutment at the bottom end of the openings 29 (FIG. 3) in the closed position of the cover on the orifice of the housing to maintain the clearance e under the restoring action of the spring 25.

The operation of the device is now described.

Figure 3:
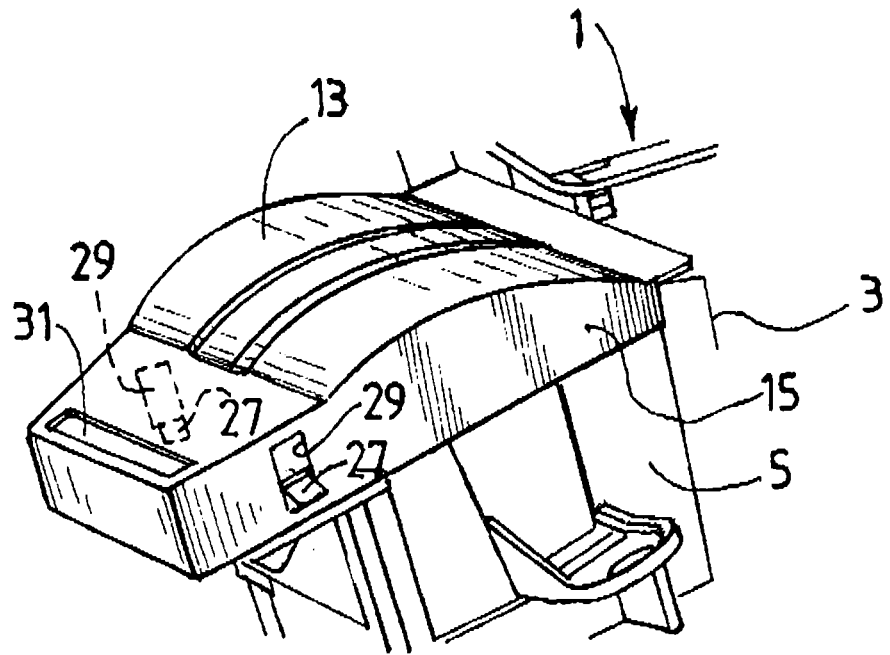
FIGS. 3 and 4 are perspective views of the cover of the housing of the device of FIG. 1, respectively before an impact and after an impact.

In the traveling position of the vehicle, the cover of the housing is in the closed position, being maintained in the clearance space e as shown in FIG. 3.

Let us assume that an impact has taken place on the hood 2 in an area covering the device 1. Said impact is firstly absorbed by the hood 2 which deforms, then by the cover 13 and potentially the remaining part of the device which is less rigid than the housing.

Figure 4:
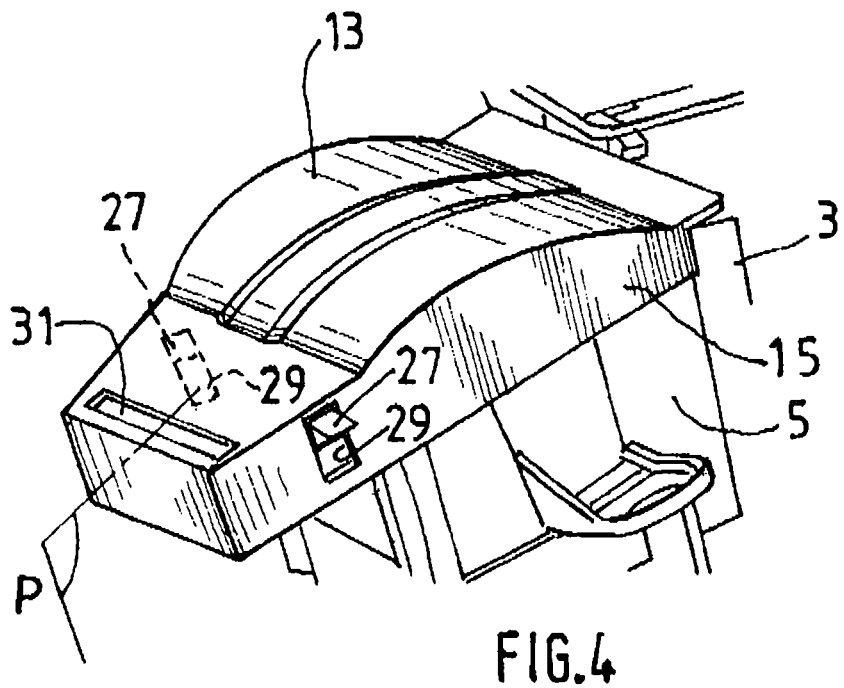

The side of the cover that is separated from the orifice of the housing thus moves aside with the impact (FIG. 4) in a downward movement having an amplitude which is equal to the permitted travel e of the clips 27 in the openings 29, for example approximately 12 mm, the cover at the end of travel thus coming into abutment with the orifice 17 of the housing and the clips 27 then each being located at the upper end of the openings 29 (FIG. 4). The moving-aside of the cover due to the impact, apart from the fact that it absorbs at least part of the impact, results in a reduced risk of breakage of the cover which, if it remains intact during the impact, may then be restored to its original position after the engine hood has been straightened out. Naturally, if the impact is violent, the cover may collapse, break and the clips leave the openings.

It is also possible to provide as retaining means a seal and/or friction or brake element (not shown) fixed to the cover and/or to the edge of the housing, decelerating the downward movement of the cover as it approaches the edge of the orifice 21 in the event of an impact and increasing the downward force of the cover against the edge of the orifice and thus accordingly damping the impact.

Naturally, the raised position of the cover could be ensured by a different retaining means from that described, for example as mentioned above, an actuator arrangement, in particular a pneumatic actuator arrangement, or a seal consisting of foam or elastomer, in place of the leaf spring or any other equivalent means, several of said means being able to be used.

The invention claimed is:

1. An electric vehicle charging-socket flap device, comprising:
   a frame comprising a peripheral sidewall, an aperture which extends through the frame, and a housing which is coupled to the peripheral sidewall adjacent to the aperture, the housing having a bottom wall connected to the peripheral sidewall to define an internal region, and an upper orifice that exposes said internal region;
   a mobile gate coupled to the frame and forming a flap which closes the aperture of the frame, the mobile gate comprising an articulation element which is made in one piece with the mobile gate and is accommodated in the housing; and
   a cover which closes the upper orifice of the housing, wherein the cover is mounted on the upper orifice of the housing so as to be separated from the upper orifice on at least one edge of the upper orifice, in a position in which the upper orifice is kept closed on the housing and the cover being kept separated from the at least one edge of the upper orifice by a retaining element of the cover which permits the cover to be displaced in a damped manner toward the at least one edge of the upper orifice in event of an impact of a pedestrian on an area of a wall of a body of the vehicle covering the charging-socket flap device.

2. The device as claimed in claim 1, wherein the retaining element is configured to restore the cover from a position in abutment against the upper orifice to a position separated from the at least one edge of the upper orifice where free displacement of the articulation element may be carried out.

3. The device as claimed in claim 1, wherein a force exerted by the retaining element for retaining or restoring the cover such that it is separated from the upper orifice of the housing is adjusted to a value sufficient to dampen impact of the pedestrian, on the flap device.

4. The device as claimed in claim 1, wherein the retaining element comprises at least one leaf spring fixed to a part the cover or to the at least one edge of the upper orifice and in engagement with the corresponding at least one edge of the upper orifice or the corresponding part of the cover, respectively.

5. The device as claimed in claim 1, wherein the retaining element is selected from an arrangement of a shock-absorbing actuator or a brake connected to the cover and to the upper orifice of the housing, or a seal of foam or elastomeric material interposed between the cover and the upper orifice of the housing.

6. The device as claimed in claim 1, wherein in the closed position, the retaining element retains the cover separated from the at least one edge of the upper orifice of the housing by a distance sufficient to absorb displacement clearance of the articulation element in the housing.

7. The device as claimed in claim 1, wherein on at least one part of its periphery the cover comprises a skirt surrounding the at least one edge of the orifice of the housing when the cover is in the closed position.

8. The device as claimed in claim 7, wherein the cover is guided in its displacement in a damped manner toward the at least one edge of the upper orifice of the housing, via at least one opening, or two opposing lateral openings of the skirt of the cover, each cooperating with a corresponding guide element of the housing slidably mounted in the opening.

9. The device as claimed in claim 8, wherein the guide element forms an end-of-travel element of the cover at one end of the aperture in the separated position of the cover on the upper orifice of the housing, and an end-of-travel stop element of the cover at the other end of the aperture in event of the impact.

10. A vehicle comprising an electrical charging-socket flap device as claimed in claim 1.

* * * * *